US006480648B1

(12) United States Patent
Wade et al.

(10) Patent No.: US 6,480,648 B1
(45) Date of Patent: Nov. 12, 2002

(54) TECHNIQUE FOR DETECTING THE STATUS OF WDM OPTICAL SIGNALS

(75) Inventors: Robert K. Wade, Boca Raton, FL (US); Ian Turner, Stratham, NH (US); Alan Willner, Los Angeles, CA (US); Joseph R. Dempewolf, Des Montes, NM (US); William W. Peck, Lewisville, TX (US)

(73) Assignee: LightChip, Inc., Salem, NH (US)

( * ) Notice: Subject to any disclaimer, the term of this patent is extended or adjusted under 35 U.S.C. 154(b) by 0 days.

(21) Appl. No.: 09/578,721

(22) Filed: May 26, 2000

Related U.S. Application Data

(63) Continuation-in-part of application No. 09/392,670, filed on Sep. 8, 1999, now Pat. No. 6,298,182, and a continuation-in-part of application No. 09/392,831, filed on Sep. 8, 1999, now Pat. No. 6,181,853, and a continuation-in-part of application No. 09/382,492, filed on Aug. 25, 1999, now Pat. No. 6,404,945, and a continuation-in-part of application No. 09/382,624, filed on Aug. 25, 1999, now Pat. No. 6,271,970, and a continuation-in-part of application No. 09/363,041, filed on Jul. 29, 1999, now Pat. No. 6,243,513, and a continuation-in-part of application No. 09/363,042, filed on Jul. 29, 1999, now Pat. No. 6,236,780, and a continuation-in-part of application No. 09/342,142, filed on Jun. 29, 1999, now Pat. No. 6,289,155, and a continuation-in-part of application No. 09/323,094, filed on Jun. 1, 1999, now Pat. No. 6,263,135, and a continuation-in-part of application No. 09/257,045, filed on Feb. 25, 1999, now Pat. No. 6,137,933.

(51) Int. Cl.[7] .......................... G02B 6/293; H04J 14/02

(52) U.S. Cl. .......................... 385/24; 359/124; 359/155

(58) Field of Search ............................. 385/15, 24, 39; 359/124, 127–131, 155

(56) References Cited

U.S. PATENT DOCUMENTS 4,111,524 A 9/1978 Tomlinson, III ......... 350/96.19
4,153,330 A 5/1979 Tomlinson, III ......... 350/96.17
4,198,117 A 4/1980 Kobayashi ............... 350/96.19
4,274,706 A 6/1981 Tangonan ................ 350/96.19
4,279,464 A 7/1981 Colombini ............... 350/96.19
4,299,488 A 11/1981 Tomlinson, III ............ 356/328
4,343,532 A 8/1982 Palmer ................... 350/96.19
4,387,955 A 6/1983 Ludman et al. .......... 350/96.19
4,479,697 A 10/1984 Kapany et al. .......... 350/96.18

(List continued on next page.)

OTHER PUBLICATIONS

G. R. Harrison, Ph.D., Sc.D. et al., Practical Spectroscopy, Chapter 4—Diffraction–Grating Spectrogrpahs, Prentice–Hall (1948).

W. J. Tomlinson, Wavelength multiplexing in multimode optical fibers, Applied Optics, vol. 16, No. 8 (Aug. 1977).

W.J. Tomlinson et al., Optical multiplexer for multimode fiber transmission systems, Appl. Phys. Lett., vol. 31, No. 3 (Aug. 1977).

W.J. Tomlinson et al., Optical wavelength–division–multiplexer for the 1–1.4 μm spectral region, Electronics Letters, vol. 14, No. 11 (May 25, 1973).

(List continued on next page.)

*Primary Examiner*—John D. Lee
(74) *Attorney, Agent, or Firm*—Hunton & Williams

(57) ABSTRACT

A technique for detecting the status of wavelength division multiplexed optical signals is disclosed. In a preferred embodiment, the technique is realized by first splitting an original, multiplexed, polychromatic optical beam into at least two representative, multiplexed, polychromatic optical beams. Next, a first of the at least two representative, multiplexed, polychromatic optical beams is separated according to wavelength into a plurality of optical signal channels, wherein each of the plurality of optical signal channels are for communicating a respective, representative optical signal via a respective, representative, discrete, monochromatic optical beam. Finally, the presence or absence of a representative optical signal is detected on each of the plurality of optical signal channels.

20 Claims, 2 Drawing Sheets

10
22
18
24
16
demux
detector
splitter
input multiplexed beam
output multiplexed beam
12
14
20

U.S. PATENT DOCUMENTS

| | | | | |
|---|---|---|---|---|
| 4,522,462 A | | 6/1985 | Large et al. | 350/96.19 |
| 4,583,820 A | | 4/1986 | Flamand et al. | 350/96.19 |
| 4,622,662 A | | 11/1986 | Laude et al. | 370/3 |
| 4,626,069 A | | 12/1986 | Dammann et al. | 350/162.2 |
| 4,634,215 A | | 1/1987 | Reule | 350/96.16 |
| 4,643,519 A | | 2/1987 | Bussard et al. | 350/96.19 |
| 4,652,080 A | | 3/1987 | Carter et al. | 350/96.19 |
| 4,671,607 A | | 6/1987 | Laude | 350/96.15 |
| 4,703,472 A | | 10/1987 | Blumentritt et al. | 370/3 |
| 4,708,425 A | | 11/1987 | Gouali et al. | 350/96.16 |
| 4,726,645 A | | 2/1988 | Yamashita et al. | 350/96.18 |
| 4,740,951 A | | 4/1988 | Lizet et al. | 370/3 |
| 4,741,588 A | | 5/1988 | Nicia et al. | 350/96.19 |
| 4,744,618 A | | 5/1988 | Mahlein | 350/96.19 |
| 4,746,186 A | | 5/1988 | Nicia | 350/96.13 |
| 4,748,614 A | | 5/1988 | Dammann et al. | 370/3 |
| 4,749,247 A | | 6/1988 | Large | 350/96.16 |
| 4,752,108 A | | 6/1988 | Vollmer | 350/96.12 |
| 4,760,569 A | | 7/1988 | Mahlein | 350/3 |
| 4,763,969 A | | 8/1988 | Khoe et al. | 350/96.19 |
| 4,773,063 A | | 9/1988 | Hunsperger et al. | 370/3 |
| 4,786,133 A | | 11/1988 | Gidon et al. | 350/96.19 |
| 4,819,224 A | | 4/1989 | Laude | 370/3 |
| 4,834,485 A | | 5/1989 | Lee | 350/96.19 |
| 4,836,634 A | | 6/1989 | Laude | 350/96.19 |
| 4,857,726 A | | 8/1989 | Kinney et al. | 250/226 |
| 4,923,271 A | | 5/1990 | Henry et al. | 350/96.19 |
| 4,926,412 A | | 5/1990 | Jannson et al. | 370/3 |
| 4,930,855 A | | 6/1990 | Clark et al. | 350/96.19 |
| 4,934,784 A | | 6/1990 | Kapany et al. | 350/96.18 |
| 5,026,131 A | | 6/1991 | Jannson et al. | 350/3.7 |
| 4,107,359 A | | 4/1992 | Ohuchida | 359/124 |
| 5,170,451 A | | 12/1992 | Ohshima | 385/43 |
| 5,228,103 A | | 7/1993 | Chen et al. | 385/14 |
| 5,278,687 A | | 1/1994 | Jannson et al. | 359/125 |
| 5,355,237 A | | 10/1994 | Lang et al. | 359/130 |
| 5,363,220 A | | 11/1994 | Kuwayama et al. | 359/3 |
| 5,440,416 A | | 8/1995 | Cohen et al. | 359/127 |
| 5,442,472 A | | 8/1995 | Skrobko | 359/110 |
| 5,450,510 A | | 9/1995 | Boord et al. | 385/37 |
| 5,457,573 A | | 10/1995 | Iida et al. | 359/369 |
| 5,500,910 A | | 3/1996 | Boudreau et al. | 385/24 |
| 5,513,289 A | | 4/1996 | Hosokawa et al. | 385/33 |
| 5,526,155 A | | 6/1996 | Know et al. | 359/130 |
| 5,541,774 A | | 7/1996 | Blankenbecler | 359/653 |
| 5,555,334 A | | 9/1996 | Ohnishi et al. | 385/93 |
| 5,583,683 A | | 12/1996 | Scobey | 359/127 |
| 5,606,434 A | | 2/1997 | Feldman et al. | 359/3 |
| 5,657,406 A | | 8/1997 | Ball | 385/24 |
| 5,703,722 A | | 12/1997 | Blankenbecler | 359/653 |
| 5,742,416 A | | 4/1998 | Mizrahi | 359/134 |
| 5,745,270 A | | 4/1998 | Koch | 359/124 |
| 5,745,271 A | | 4/1998 | Ford et al. | 359/130 |
| 5,745,612 A | | 4/1998 | Wang et al. | 385/24 |
| 5,748,350 A | | 5/1998 | Pan et al. | 359/130 |
| 5,748,815 A | | 5/1998 | Hamel et al. | 385/37 |
| 5,768,450 A | | 6/1998 | Bhagavatula | 385/24 |
| 5,777,763 A | | 7/1998 | Tomlinson, III | 359/130 |
| 5,838,488 A | * | 11/1998 | Kobayashi | 359/124 X |
| 5,880,834 A | | 3/1999 | Chrisp | 356/328 |
| 6,014,248 A | * | 1/2000 | Kobayashi et al. | 359/341 |
| 6,091,539 A | * | 7/2000 | Kosaka | 359/124 X |

OTHER PUBLICATIONS

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM system in the 0.8 $\mu$m wavelength region, Applied Optics, vol. 18, No. 16 (Aug. 15, 1979).

R. Watanabe et al., Optical Demuliplexer Using Concave Grating in 0.7–0.9 $\mu$m Wavelength Region, Electronics Letters, vol. 16, No. 3 (Jan. 31, 1980).

K. Kobayashi et al., Microoptic Grating Multiplexers and Optical Isolators for Fibers–Optic Communications, Journal of Quantum Electronics, vol. QE–16, No. 1 (Jan. 1980).

Y. Fujii et al., Optical Demuliplexer Using a Silicon Eschelette Grating, IEEE Journal of Quantum Electronics, vol. QE–16, No. 2 (Feb. 1980).

W. J. Tomlinson, Application of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B.D. Metcalf et al., High–capacity wavelength demultiplexing with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Applications, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and –demultiplexing by using a substrate–mode grating pair, Optics Letters, vol. 17, No. 22 (Nov. 15, 1992).

M. Wu et al., Design Considerations for Rowland Circle GratingsUsed in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288 (No Date).

A. Stavdas et al., Free–Space Aberration–Corrected Diffraction Grating Demultiplexer for Application in Densely–Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channels spacing and 0.7nm bandwidth, SPIE, vol. 1578, Fiber Networks Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. 1 (Sep. 13–17, 1998).

M. Seki et al., 20–Channel Micro–Optic Grating Demultiplexer for 1.1–16μm Band Using a Small Focusing Parameter Graded—Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communications, Conference Proceedings (Sep. 8–11, 1981).

J. Conradi et al., Laser Based WDM Multichannel Video Transmission System, Electronic Letters, vol. 17, No. 2 (Jan. 22, 1981).

J. Laude et al., Wavelength division multiplexing/demultiplexing (WDM) using diffraction gratings, SPIE, vol. 503, Application, Theory, and Fabrication of Periodic Structures (1984).

A. Livanos et al., Chirped–grating demultiplexers in dielectric waveguids, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Photonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjunction with numtiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communication–ECOC83, Geneva, Switzerland (Oct. 23–26, 1983).

R. Watanabe et al., Optical Grating Multiplexer in the 1.1–1.5mm Wavelength Region, Electronics Letters, vol. 16, No. 3 (Jan. 31, 1980).

G.D. Khoe, New Integrated Subscriber Star Network Combining Maximum Versatility With Minimum Costs of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glass using an ion etching technique, SPIE vol. 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic, Structures (1984).

D.R. Wisely, 32 Channel WDM Multiplexer with 1nm Channel Spacing and 0.7 nm Bandwidth, Electronics Letters, vol. 27, No. 6, pp. 520–521 (Mar. 14, 1991).

C. Koeppen, et al., High Resolution Fiber Grating Optical Network Monitor, National Fiber Optic Engineers Conference, Technical Proceedings, vol. II (Sep. 13–17, 1998).

M.J. Cohen, et al. InGaAs photodiode arrays for DWDM monitoring and receiving, Lightwave, pp. 99–101 (Aug. 1999).

J.P. Laude, Wavelength Division Multiplexing, pp. 116–117, (1993), Prentice Hall (New York).

Sami Hendow, et al., Performance Monitors Enable Remote Channel Management, Lightwave Special Reports, pp. 62–66 and 72 (Feb. 2000).

Adrian Meldrum C– and L–band Channel Monitoring, Lightwave Special Reports, pp. 68–72 (Feb. 2000).

* cited by examiner

TECHNIQUE FOR DETECTING THE STATUS OF WDM OPTICAL SIGNALS

CROSS-REFERENCE TO RELATED APPLICATIONS

This patent application is a continuation-in-part application of U.S. patent application Ser. No. 09/257,045, filed Feb. 25, 1999 (now U.S. Pat. No. 6,137,933); U.S. patent application Ser. No. 09/323,094, filed Jun. 1, 1999 (now U.S. Pat. No. 6,263,135); U.S. patent application Ser. No. 09/342,142, filed Jun. 29, 1999 (now U.S. Pat. No. 6,289,155); U.S. patent application Ser. No. 09/382,492, filed Aug. 25, 1999 (now U.S. Pat. No. 6,404,945); U.S. patent application Ser. No. 09/382,624, filed Aug. 25, 1999 (now U.S. Pat. No. 6,271,970); U.S. patent application Ser. No. 09/363,041, filed Jul. 29, 1999 (now U.S. Pat. No. 6,243,513); U.S. patent application Ser. No. 09/363,042, filed Jul. 29, 1999 (now U.S. Pat. No. 6,236,780); U.S. patent application Ser. No. 09/392,670, filed Sep. 8, 1999 (now U.S. Pat. No. 6,298,182); and U.S. patent application Ser. No. 09/392,831, filed Sep. 8, 1999 (now U.S. Pat. No. 6,181,853); all of which are hereby incorporated herein by reference.

FIELD OF THE INVENTION

The present invention relates generally to wavelength division multiplexing and, more particularly, to a technique for detecting the status of wavelength division multiplexed optical signals.

BACKGROUND OF THE INVENTION

As the use of wavelength division multiplexing (WDM) technology grows, the use of WDM will evolve from simple, isolated point-to-point systems to interconnected systems such as metro rings, WANs, and CANs. In order for systems to be able to connect and communicate together, they will require many new types of optical add-drop multiplexers, fiber switches, and wavelength optical switches. Due to the typical requirement that a network always be 100% reliable, there will be a great need to verify that individual signal channels have optical signals on them, as well as the power level of each optical signal. For example, at an add-drop multiplexer node, there is a real need to determine if an optical switch has correctly operated to drop traffic to the node. Similarly, there is a real need to measure the power in each optical signal either before or after an erbium-doped fiber amplifier (EDFA) to ensure that the gain is equal across all signal channels.

At present, devices for detecting the presence and power of wavelength division multiplexed optical signals are not widely available primarily because the commercial use of WDM systems is new and most signal restoration and monitoring is performed down on the electronic level as part of a synchronous optical network (SONET), or other, protocol. Consequently, devices for detecting the presence and power of wavelength division multiplexed optical signals that are presently available such as, for example, optical spectrum analyzers, are typically very costly (e.g., over $10K per device). Also, some devices that are presently available for detecting the presence and power of wavelength division multiplexed optical signals may adversely affect the data that is being transmitted by the wavelength division multiplexed optical signals. That is, some devices that are presently available for detecting the presence and power of wavelength division multiplexed optical signals operate by intercepting the wavelength division multiplexed optical signals when detecting signal presence and power.

The wavelength division multiplexed optical signals are then typically retransmitted after detecting signal presence and power. Inherent in the interception and retransmission operations are many opportunities for failure which can adversely affect the data that is being transmitted by the wavelength division multiplexed optical signals.

In view of the foregoing, it would be desirable to provide a technique for detecting the presence and power of wavelength division multiplexed optical signals which overcomes the above-described inadequacies and shortcomings. More particularly, it would be desirable to provide a technique for detecting the status of wavelength division multiplexed optical signals in an efficient and cost effective manner.

OBJECTS OF THE INVENTION

The primary object of the present invention is to provide a technique for detecting the status of wavelength division multiplexed optical signals.

The above-stated primary object, as well as other objects, features, and advantages, of the present invention will become readily apparent from the following detailed description which is to be read in conjunction with the appended drawings.

SUMMARY OF THE INVENTION

According to the present invention, a technique for detecting the status of wavelength division multiplexed optical signals is provided. In a preferred embodiment, the technique is realized by first splitting an original, multiplexed, polychromatic optical beam into at least two representative, multiplexed, polychromatic optical beams. Next, a first of the at least two representative, multiplexed, polychromatic optical beams is separated according to wavelength into a plurality of optical signal channels. Each of the plurality of optical signal channels is for communicating a respective, representative optical signal via a respective, representative, discrete, monochromatic optical beam, wherein each representative optical signal is representative of a corresponding optical signal in the original, multiplexed, polychromatic optical beam. Finally, the presence or absence of a representative optical signal is detected on each of the plurality of optical signal channels.

In accordance with other aspects of the present invention, the original, multiplexed, polychromatic optical beam is beneficially split according to optical beam power. For example, the first representative, multiplexed, polychromatic optical beam preferably includes less than approximately 1% of the power of the original, multiplexed, polychromatic optical beam.

In accordance with further aspects of the present invention, the first representative, multiplexed, polychromatic optical beam is beneficially separated by demultiplexing the first representative, multiplexed, polychromatic optical beam. For example, the first representative, multiplexed, polychromatic optical beam is preferably collimated and then separated into the plurality of optical signal channels for communicating respective, representative optical signals via respective, representative, discrete, monochromatic optical beams. Each representative, discrete, monochromatic optical beam is then preferably focused onto a corresponding detector. The first representative, multiplexed, polychromatic optical beam is preferably reflected during the demultiplexing process. Alternatively, each representative, discrete, monochromatic optical beam may be reflected during the demultiplexing process.

In accordance with still further aspects of the present invention, it may be beneficial to sense the power of a representative optical signal that is present on each of the plurality of optical signal channels. The power of a representative optical signal is preferably sensed by sensing the intensity of a corresponding representative, discrete, monochromatic optical beam that is present on one of the plurality of optical signal channels.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
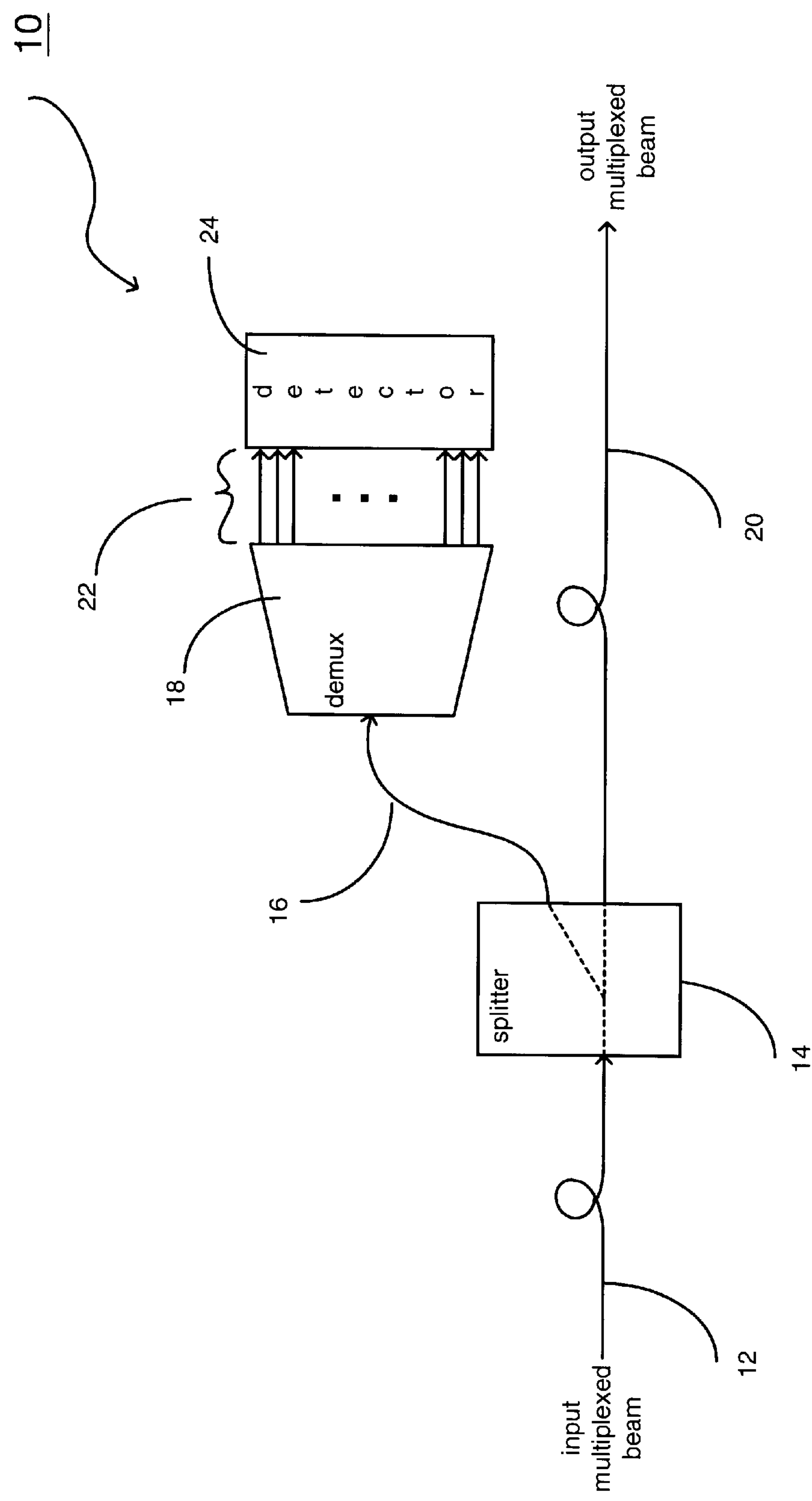
FIG. 1 is a schematic diagram of an apparatus for detecting the status of wavelength division multiplexed optical signals in accordance with the present invention.

Referring to FIG. 1, there is shown schematic diagram of an apparatus 10 for detecting the status of wavelength division multiplexed optical signals in accordance with the present invention. The apparatus 10 comprises an input fiber 12 for communicating an original, multiplexed, optical input beam to a splitter 14. The original, multiplexed, polychromatic optical input beam being communicated over the input fiber 12 comprises a plurality of optical signal channels (e.g., 33 optical signal channels) for carrying a respective plurality of optical signals (e.g., 33 optical signals) at a respective plurality of unique center wavelengths, which are preferably, but not required to be, within the infrared (IR) region of the electromagnetic spectrum. The plurality of optical signals that are being carried by the respective plurality of optical signal channels in the original, multiplexed, polychromatic optical input beam are multiplexed together after first being superimposed on each corresponding unique center wavelength by means (e.g., laser diodes connected to a plurality of optical fibers), which are not shown here and which do not form a part of this invention, but are well known in the art. The unique center wavelengths of the plurality of optical signals are appropriately preselected such that the optical signal channels, and hence the optical signals, do not interfere with each other (i.e., there is sufficient channel/signal spacing), and the optical transmission losses through optical fibers and other optical elements are low, as is also well known in the art.

The splitter 14 is preferably a power splitter which operates by splitting the power across all of the unique wavelengths of the original, multiplexed, polychromatic optical input beam into two representative, multiplexed, polychromatic optical beams. That is, the two representative, multiplexed, polychromatic optical beams represent the original, multiplexed, polychromatic optical input beam in every way except for the amount of power that each of the two representative, multiplexed, polychromatic optical beams possess. A first representative, multiplexed, polychromatic optical beam possessing only a very small amount (e.g., typically 0.1% to 1.0%) of the power of the original, multiplexed, polychromatic optical input beam is directed to transfer fiber 16, which communicates the first representative, multiplexed, polychromatic optical beam to a wavelength division demultiplexer 18. A second representative, multiplexed, polychromatic optical beam possessing a very large amount (e.g., typically 99.0% to 99.9%) of the power of the original, multiplexed, polychromatic optical input beam is directed to output fiber 20, which communicates the second representative, multiplexed, polychromatic optical beam to other optical elements within an optical network, which are not shown here and which do not form a part of this invention, but are well known in the art.

At this point it should be noted that the original, multiplexed, polychromatic optical input beam may be further split into additional representative, multiplexed, polychromatic optical beams if such are desired or required for operation within an optical network. The point here being that only a single, representative, multiplexed, polychromatic optical beam (i.e., the first representative, multiplexed, polychromatic optical beam) possessing a very small amount (e.g., typically 0.1% to 1.0%) of the power of the original, multiplexed, polychromatic optical input beam is required to detect the status of wavelength division multiplexed optical signals in accordance with the present invention.

The wavelength division demultiplexer 18 operates by separating the first representative, multiplexed, polychromatic optical beam into the plurality of optical signal channels 22. That is, the wavelength division demultiplexer 18 operates to physically and spatially separate the first representative, multiplexed, polychromatic optical beam according to each of the plurality of unique center wavelengths of the respective plurality of optical signals into the respective plurality of optical signal channels 22. Thus, each of the plurality of optical signal channels 22, and hence each of the plurality of optical signals, is physically and spatially separated from each other. However, the plurality of physically and spatially separated optical signals being carried by the respective plurality of physically and spatially separated optical signal channels 22 are still representative of the plurality of optical signals being carried by the respective plurality of optical signal channels in the original, multiplexed, polychromatic optical input beam. For example, each of the plurality of physically and spatially separated optical signal channels 22 may carry a respective, representative one of the plurality of physically and spatially separated optical signals via a discrete, monochromatic optical beam at a respective, representative one of the plurality of unique center wavelengths. Alternatively, any one or all of the plurality of physically and spatially separated optical signal channels 22 may not carry an optical signal via a discrete, monochromatic optical beam at one of the plurality of unique center wavelengths (or may carry a very weak optical signal via a discrete, monochromatic optical beam at one of the plurality of unique center wavelengths), but this may still be representative of any one or all of the plurality of optical signals being carried by a respective one of the plurality of optical signal channels in the original, multiplexed, polychromatic optical input beam. That is, an optical signal may not be present (or may only be weakly present) on any one or all of the plurality of optical signal channels in the original, multiplexed, polychromatic optical input beam due to some type of system or component failure occurring prior to the splitter 14. In any of the above cases, the present invention apparatus 10 operates to detect the presence or absence of an optical signal on each of the plurality of optical signal channels, as described in detail below. Also, if an optical signal is indeed present on any of the plurality of optical signal channels, the present invention apparatus 10 operates to sense the power level of that optical signal, as described in detail below.

At this point it should be noted that the wavelength division demultiplexer 18 is preferably of the type described in U.S. patent application Ser. No. 09/257,045, filed Feb. 25, 1999 (now U.S. Pat. No. 6,137,933); U.S. patent application Ser. No. 09/323,094, filed Jun. 1, 1999 (now U.S. Pat. No. 6,263,135); U.S. patent application Ser. No. 09/342,142, filed Jun. 29, 1999 (now U.S. Pat. No. 6,289,155); U.S. patent application Ser. No. 09/382,492, filed Aug. 25, 1999 (now U.S. Pat. No. 6,404,945); U.S. patent application Ser. No. 09/382,624, filed Aug. 25, 1999 (now U.S. Pat. No. 6,271,970); U.S. patent application Ser. No. 09/363,041, filed Jul. 29, 1999 (now U.S. Pat. No. 6,243,513); U.S. patent application Ser. No. 09/363,042, filed Jul. 29, 1999 (now U.S. Pat. No. 6,236,780); U.S. patent application Ser. No. 09/392,670, filed Sep. 8, 1999 (now U.S. Pat. No. 6,298,182); or U.S. patent application Ser. No. 09/392,831, filed Sep. 8, 1999 (now U.S. Pat. No. 6,181,853); all of which are incorporated herein by reference. However, the wavelength division demultiplexer 18 is not limited in this regard and may be of another type which would also allow for detecting the status of wavelength division multiplexed optical signals in accordance with the present invention.

Each of the plurality of physically and spatially separated optical signal channels 22 are directed to a detector 24, which operates to detect the presence or absence of an optical signal on each of the plurality of optical signal channels 22. The detector 24 also operates to sense the power level of any optical signal that is present on any of the plurality of optical signal channels 22. The detector 24 is preferably a photodetector array and may be either directly attached to, or a part of, the demultiplexer 18, or physically separate, and proximately spaced, from the demultiplexer 18. Each photodetector in the photodetector array 24 can detect the presence or absence of an optical signal by detecting the presence or absence of an associated discrete, monochromatic optical beam that is carrying the optical signal on a corresponding one of the plurality of optical signal channels 22. Also, each photodetector in the photodetector array 24 can sense the power level of an optical signal by sensing the intensity of an associated discrete, monochromatic optical beam that is carrying the optical signal on a corresponding one of the plurality of optical signal channels 22. Thus, the present invention apparatus 10 can detect whether an optical signal is present on each individual optical signal channel, as well as sense the power of the optical signal on each individual optical signal channel.

Figure 2:
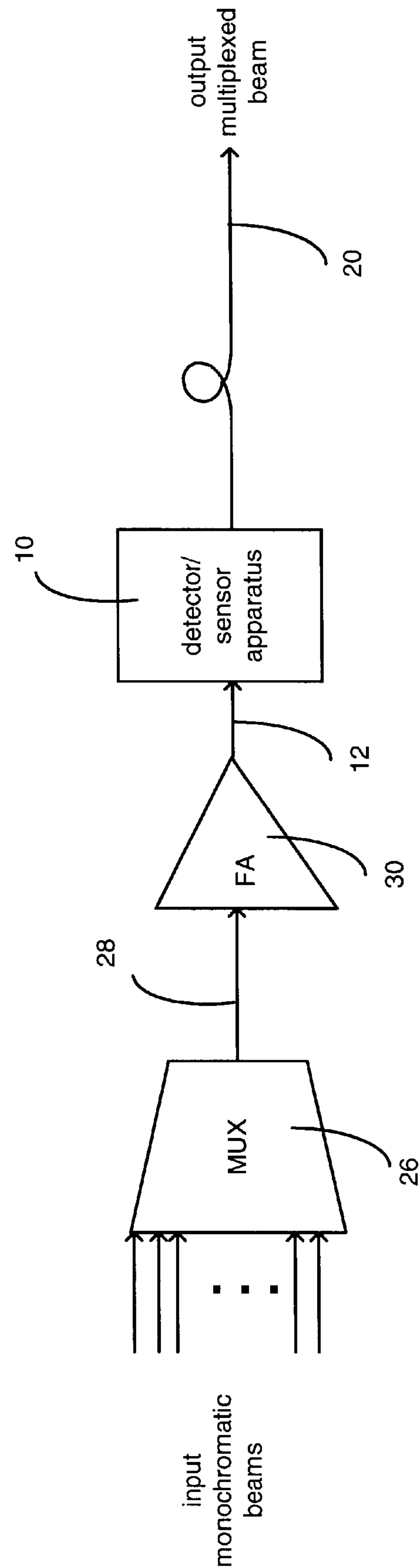
FIG. 2 is a schematic diagram illustrating how the present invention apparatus can be used to detect signal presence and power after a fiber amplifier.

At this point it should be noted that the present invention apparatus 10 may have a variety of applications including, but not limited to, detecting optical signal power before or after a fiber amplifier, detecting correct operation of a optical add-drop multiplexer (OAD), and detecting a channel failure (and thereby potentially decreasing the response time for restoration or redundant backup). For example, as shown in FIG. 2, the present invention apparatus 10 can be used to detect optical signal presence and power after a fiber amplifier. That is, a plurality of discrete, monochomatic optical input beams are communicated to a wavelength division multiplexer 26, which combines the plurality of discrete, monochomatic optical input beams into a multiplexed, polychromatic optical beam. The multiplexed, polychromatic optical beam is communicated over fiber 28 to fiber amplifier 30, which can be, for example, an erbium-doped fiber amplifier (EDFA). The fiber amplifier 30 increases the intensity of multiplexed, polychromatic optical beam across all optical signal channels and communicates the resulting higher intensity multiplexed, polychromatic optical beam to the present invention apparatus 10 over fiber 12. As described above, the present invention apparatus 10 detects whether an optical signal is present on each individual optical signal channel, as well as senses the power of the optical signal on each individual optical signal channel. Only a very small amount of signal power is required by the present invention apparatus 10. Thus, essentially all of the higher intensity multiplexed, polychromatic optical beam is directed to output fiber 20, which communicates the multiplexed, polychromatic optical beam to other optical elements within an optical network, which are not shown here and which do not form a part of this invention, but are well known in the art.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for detecting the status of wavelength division multiplexed optical signals, the method comprising the steps of:

splitting an original, multiplexed, polychromatic optical beam into at least two representative, multiplexed, polychromatic optical beams;

collimating a first of the at least two representative, multiplexed, polychromatic optical beams;

separating the first collimated, representative, multiplexed, polychromatic optical beam according to wavelength into a plurality of collimated, representative, monochromatic optical beams, each of the plurality of collimated, representative, monochromatic optical beams for communicating a respective, representative optical signal;

focusing each of the plurality of collimated, representative, monochromatic optical beams; and detecting the presence or absence of a respective, representative optical signal on each of the plurality of focused, representative, monochromatic optical beams.

2. The method as defined in claim 1, wherein each respective, representative optical signal is representative of a corresponding optical signal in the original, multiplexed, polychromatic optical beam.

3. The method as defined in claim 1, wherein the step of splitting includes the step of:

splitting the original, multiplexed, polychromatic optical beam according to optical beam power.

4. The method as defined in claim 3, wherein the first representative, multiplexed, polychromatic optical beam includes less than approximately 1% of the power of the original, multiplexed, polychromatic optical beam.

5. The method as defined in claim 1, further comprising the step of:

directing each of the plurality of focused, representative, monochromatic optical beams to a corresponding detector.

6. The method as defined in claim 1, wherein the step of focusing includes focusing each of the plurality of collimated, representative, monochromatic optical beams directly onto a corresponding detector.

7. The method as defined in claim 1, further comprising the step of:

reflecting the first collimated, representative, multiplexed, polychromatic optical beam.

8. The method as defined in claim 1, further comprising the step of:

reflecting each of the plurality of collimated, representative, monochromatic optical beams.

9. The method as defined in claim 1, further comprising the step of:

sensing the power of a respective, representative optical signal that is present on each of the plurality of focused, representative, monochromatic optical beams.

10. The method as defined in claim 9, wherein the step of sensing includes the step of:

sensing the intensity of each of the plurality of focused, representative, monochromatic optical beams.

11. An apparatus for detecting the status of wavelength division multiplexed optical signals, the apparatus comprising:

a splitter for splitting an original, multiplexed, polychromatic optical beam into at least two representative, multiplexed, polychromatic optical beams;

a demultiplexer comprising:

a lens system for collimating a first of the at least two representative, multiplexed, polychromatic optical beams, and for focusing each of a plurality of collimated, representative, monochromatic optical beams; and a diffraction grating for separating the first collimated, representative, multiplexed, polychromatic optical beam according to wavelength into the plurality of collimated, representative, monochromatic optical beams, each of the plurality of collimated, representative, monochromatic optical beams for communicating a respective, representative optical signal; and a detector for detecting the presence or absence of a respective, representative optical signal on each of the plurality of focused, representative, monochromatic optical beams.

12. The apparatus as defined in claim 11, wherein each respective, representative optical signal is representative of a corresponding optical signal in the original, multiplexed, polychromatic optical beam.

13. The apparatus as defined in claim 11, wherein the splitter splits the original, multiplexed, polychromatic optical beam according to optical beam power.

14. The apparatus as defined in claim 13, wherein the first representative, multiplexed, polychromatic optical beam includes less than approximately 1% of the power of the original, multiplexed, polychromatic optical beam.

15. The apparatus as defined in claim 11, further comprising:

means for directing each of the plurality of focused, representative, monochromatic optical beams to the detector.

16. The apparatus as defined in claim 11, wherein the demultiplexer focuses each of the plurality of collimated, representative, monochromatic optical beams directly onto the detector.

17. The apparatus as defined in claim 11, wherein the demultiplexer includes a reflective element for reflecting the first collimated, representative, multiplexed, polychromatic optical beam.

18. The apparatus as defined in claim 11, wherein the demultiplexer includes a reflective element for reflecting each of the plurality of collimated, representative, monochromatic optical beams.

19. The apparatus as defined in claim 11, wherein the detector senses the power of a respective, representative optical signal that is present on each of the plurality of focused, representative, monochromatic optical beams.

20. The apparatus as defined in claim 19, wherein the detector senses the power of a respective, representative optical signal that is present on each of the plurality of focused, representative, monochromatic optical beams by sensing the intensity of each of the plurality of focused, representative, monochromatic optical beams.

* * * * *